United States Patent
Lim et al.

(10) Patent No.: US 10,205,917 B2
(45) Date of Patent: Feb. 12, 2019

(54) IMAGE PROJECTION APPARATUS

(71) Applicant: LG ELECTRONICS INC., Seoul (KR)

(72) Inventors: Jaehyuk Lim, Seoul (KR); Jideok Kim, Seoul (KR); Jaewook Kwon, Seoul (KR); Chanyoung Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 14/520,967

(22) Filed: Oct. 22, 2014

(65) Prior Publication Data
US 2015/0116669 A1 Apr. 30, 2015

(30) Foreign Application Priority Data
Oct. 24, 2013 (KR) .......................... 10-2013-0127352

(51) Int. Cl.
| | |
|---|---|
| *H04N 9/31* | (2006.01) |
| *G02B 26/10* | (2006.01) |
| *G03B 21/20* | (2006.01) |
| *G03B 33/12* | (2006.01) |
| *G02B 5/04* | (2006.01) |

(Continued)

(52) U.S. Cl.
CPC ........... *H04N 9/3129* (2013.01); *G02B 26/10* (2013.01); *G03B 21/2033* (2013.01); *G03B 33/12* (2013.01); *H04N 9/317* (2013.01); *G02B 5/04* (2013.01); *G02B 27/141* (2013.01); *G02B 27/30* (2013.01)

(58) Field of Classification Search
CPC ........ G02B 5/04; G02B 26/10; G02B 27/104; G02B 27/1006; G02B 27/1073; G02B 27/0025; G02B 27/0972; G02B 27/10; G02B 27/142; H04N 9/3129; H04N 9/3155; H04N 9/3161; H04N 9/3164; G03B 21/2046; G03B 21/2013; G03B 21/2033; G03B 21/143; G03B 21/147; G03B 21/14

See application file for complete search history.

(56) References Cited

U.S. PATENT DOCUMENTS

2005/0063171 A1* 3/2005 Leitel .................. G02B 27/102
362/600
2006/0238660 A1* 10/2006 Takeda ............... G03B 21/2033
348/801

(Continued)

FOREIGN PATENT DOCUMENTS

KR 10-2010-0121971 A 11/2010

*Primary Examiner* — Christina Riddle
*Assistant Examiner* — Christopher Lamb, II
(74) *Attorney, Agent, or Firm* — Birch, Stewart, Kolasch & Birch, LLP

(57) ABSTRACT

An image projection image for projecting an image on a screen includes a light source, a scanning mirror and a prism. The light source includes laser diodes for emitting beams of different wavelengths. The scanning mirror reflects the beams radiated from the light source and projects the reflected beams. The prism is disposed at the rear of the scanning mirror to decenter the beams via the scanning mirror based on the wavelengths. In the image projection apparatus, the laser diodes are fixed to be vertically spaced apart from a reference height, corresponding to the wavelengths of the beams.

11 Claims, 6 Drawing Sheets

(51) Int. Cl.
*G02B 27/30* (2006.01)
*G02B 27/14* (2006.01)

(56) References Cited

U.S. PATENT DOCUMENTS

| | | | | |
|---|---|---|---|---|
| 2008/0273568 A1* | 11/2008 | Schulz | ............... | G02B 27/104 |
| | | | | 372/50.23 |
| 2009/0041070 A1 | 2/2009 | Yamagishi | | |
| 2009/0251668 A1* | 10/2009 | Takahashi | ............. | G03B 21/28 |
| | | | | 353/33 |
| 2010/0060863 A1* | 3/2010 | Hudman | ............. | G03B 21/147 |
| | | | | 353/70 |
| 2010/0277705 A1* | 11/2010 | Gollier | ............... | H04N 9/3129 |
| | | | | 353/121 |
| 2010/0315605 A1* | 12/2010 | Arita | ................ | G02B 26/0816 |
| | | | | 353/98 |
| 2011/0128602 A1* | 6/2011 | Hamano | ........... | G02B 13/0005 |
| | | | | 359/205.1 |
| 2012/0293774 A1* | 11/2012 | Inoue | .................... | G02B 13/04 |
| | | | | 353/31 |
| 2012/0300276 A1 | 11/2012 | Ohnishi | | |
| 2013/0003021 A1* | 1/2013 | Linden | ............... | G02B 27/283 |
| | | | | 353/20 |
| 2014/0118703 A1* | 5/2014 | Chang | ............... | G02B 26/101 |
| | | | | 353/69 |
| 2014/0168616 A1* | 6/2014 | Namba | ............. | G03B 21/2033 |
| | | | | 353/52 |

* cited by examiner

IMAGE PROJECTION APPARATUS

CROSS-REFERENCE TO RELATED APPLICATIONS

Pursuant to 35 U.S.C. § 119(a), this application claims the benefit of earlier filing date and right of priority to Korean Application No. 10-2013-0127352, filed on Oct. 24, 2013, the contents of which is incorporated by reference herein in its entirety.

BACKGROUND OF THE INVENTION

1. Field of the Invention

The present disclosure relates to an image projection apparatus for implementing an image using a plurality of beams generated in a light source.

2. Description of the Conventional Art

As the information technology is rapidly developed, the importance of display devices implementing a large screen is emphasized. An image projection apparatus having a function of magnifying and projecting an image is used as an example of the devices implementing the large screen.

The image projection apparatus refers to an apparatus that implements an image using beams generated in a light source and projects the implemented image. Representative examples of the image projection apparatus are a projector, a projection television, and the like (see Korean Patent Application No. 10-2009-0040936, entitled by "Image Projection Apparatus").

In the image projection apparatus, there occurs a problem in that although optical axes between light sources and a micro display device correspond to each other by adjusting the positions and angles of the light sources and a collimating lens, beams are decentered on a screen due to aberrations generated in a prism. This becomes a primary factor that causes deterioration of image quality as an image on the screen is blurred.

Therefore, a plan for increasing the image quality of the image projection apparatus by decreasing the decentration amount between beams may be considered.

SUMMARY OF THE INVENTION

Therefore, an aspect of the detailed description is to provide an image projection apparatus which can correct aberrations generated on a screen and simultaneously maximize the amount of beams incident on a surface of a micro display device.

To achieve these and other advantages and in accordance with the purpose of this specification, as embodied and broadly described herein, an image projection apparatus includes: a light source configured to include laser diodes for emitting beams of different wavelengths; a scanning mirror configured to reflect the beams radiated from the light source and project the reflected beams; and a prism disposed at the rear of the scanning mirror to decenter the beams via the scanning mirror based on the wavelengths, wherein the laser diodes are fixed to be vertically spaced apart from a reference height, corresponding to the wavelengths of the beams.

In one exemplary embodiment, the image projection apparatus may further include a base member configured to include mounting holes formed to have relative heights corresponding to the heights of the respective laser diodes.

In one exemplary embodiment, when the beams of different wavelengths are incident on the prism along the same path at one point on the screen, the relative heights may be determined based on differences in height between the beams incident on the surface of the scanning mirror.

In one exemplary embodiment, the relative height may be less than 1 mm.

In one exemplary embodiment, the image projection apparatus may further include a collimating lens disposed at the front of the light source to convert the beams of the light source into parallel beams.

In one exemplary embodiment, the collimating lens may be formed to adjust the focus of the light source by relatively moving from the light source.

In one exemplary embodiment, the laser diodes may include a red diode, a green diode and a blue diode.

In one exemplary embodiment, in the laser diodes, the red diode and the blue diode may be disposed to be spaced apart from each other in opposite direction, using the height of the red diode as the reference height.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A singular representation may include a plural representation as far as it represents a definitely different meaning from the context.

An image projection apparatus described in the present disclosure may include not only a projector and a projection TV but also a mobile terminal, a laptop computer, a personal digital assistant (PDA), a portable multimedia player (PMP), a navigation and the like, which are provided with a projector function. Hereinafter, the image projection apparatus according to the present disclosure will be described based on a projector.

Figure 1:
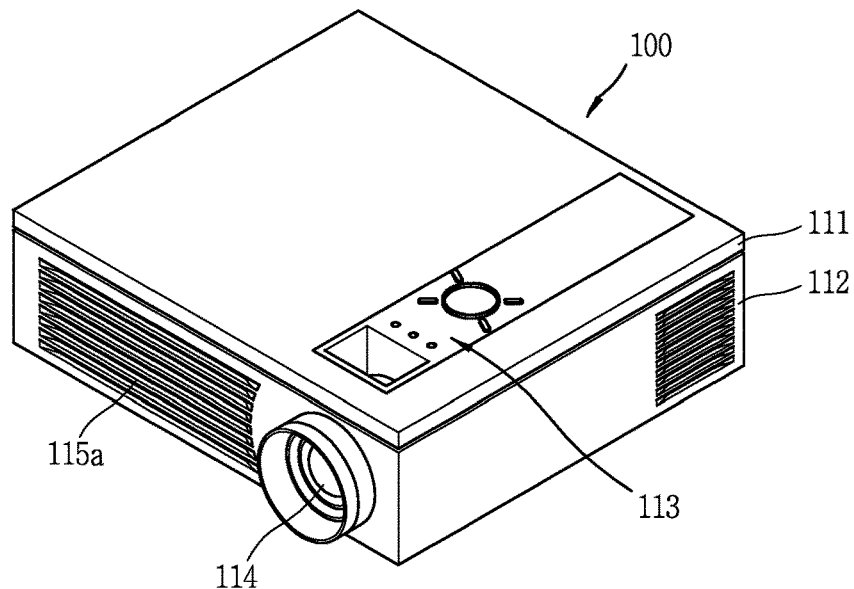
FIG. 1 is a front perspective view of an image projection apparatus according to an exemplary embodiment.

FIG. 1 is a front perspective view of an image projection apparatus 100 according to an exemplary embodiment.

Since components shown in FIG. 1 are not essential, an image projection apparatus having a larger number of components or a smaller number of components may be implemented.

The external appearance of the image projection apparatus 100 may be formed by upper and lower cases 111 and 112. Various kinds of optical components and electronic components are built in a space formed by the upper and lower cases 111 and 112. At least one middle case may be additionally disposed between the upper and lower cases 111 and 112.

A manipulation unit 113 may be disposed at the upper case 111. The manipulation unit 113 may employ any manner as long as the manipulation unit uses a tactile manner that a user operates the manipulation unit while having a tactile feeling.

The manipulation unit 113 receives a command for controlling the operation of the image projection apparatus 100. In the functional aspect, the manipulation unit 113 may be used to input a menu or the like, including start, end and the like.

In addition, the manipulation unit 113 may be manipulated to perform a zoom-in or zoom-out operation on an image projected from the image projection apparatus 100. The manipulation unit 113 may be manipulated to focus an image projected from the image projection apparatus 100.

A projection lens unit 114, a first air flow unit 115a, and the like may be disposed at the lower case 112.

The projection lens unit 114 is formed to magnify an image projected from the image projection apparatus 100. The projection lens unit 114, for example, may be configured as a lens group in which lenses for magnification and projection are disposed at a predetermined distance. The projection lens unit 114 may be formed so that the distance between the lenses for magnification and projection is adjusted by the manipulation of the manipulation unit 113. Accordingly, a zoom or focusing function of the image projection apparatus 100 can be implemented.

The first air flow unit 115a may be made of a plurality of ventilation holes, thereby ventilating air into the inside of the image projection apparatus 100. Accordingly, it is possible to implement the cooling of the image projection apparatus 100 using forced convection.

Figure 2:
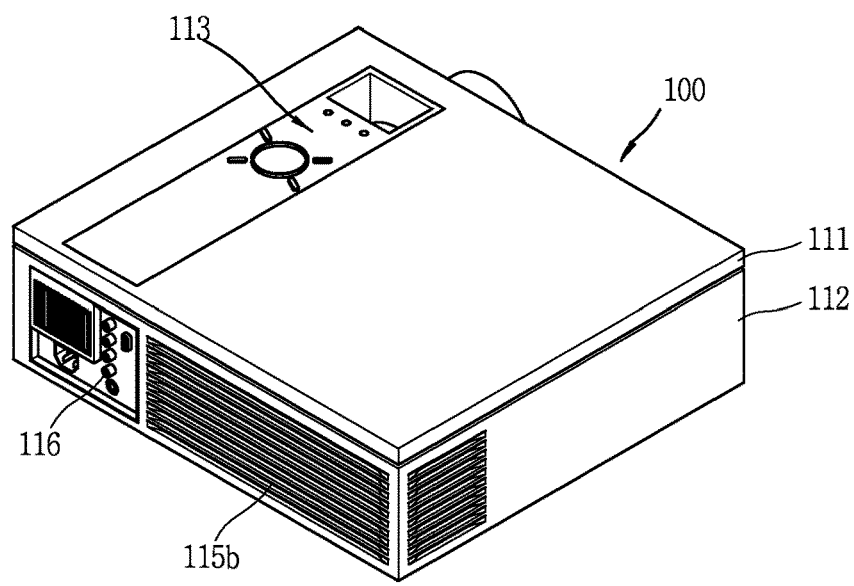
FIG. 2 is a rear perspective view of the image projection apparatus of FIG. 1.

FIG. 2 is a rear perspective view of the image projection apparatus 100 of FIG. 1.

A second air flow unit 115b, an interface 116, a power supply unit 117, and the like may be disposed at the lower case 112.

Like the first air flow unit 115a (see FIG. 1), the second air flow unit 115b may be made of a plurality of ventilation holes, thereby ventilating air into the inside of the image projection apparatus 100.

The interface 116 may be a path for enabling the image projection apparatus 100 to exchange data with external devices. Image data corresponding to an image to be projected from the image projection apparatus 100 may be received from the outside through the interface 116. Referring to the drawing, the interface 116 includes a connection terminal that can be electrically connected to an electronic device, such as a computer or a DVD player, capable of supplying image or audio data.

The power supply unit 117 is mounted in the lower case 112 for supplying power to the image projection apparatus 100. The power supply unit 117, for example, may be formed to receive a household power source, which is alternating current (AC) power source, and convert the received AC power source into a direct current (DC) power source. However, the configuration of the power supply unit 117 is not limited thereto, and the power supply unit 117 may be attachably/detachably combined as a rechargeable battery for the purpose of charging or the like.

An audio output unit may be implemented in the form of a speaker in any one of the upper and the lower case 111 and 112, and a broadcast signal receiving antenna or the like may be additionally disposed therein.

Figure 3:
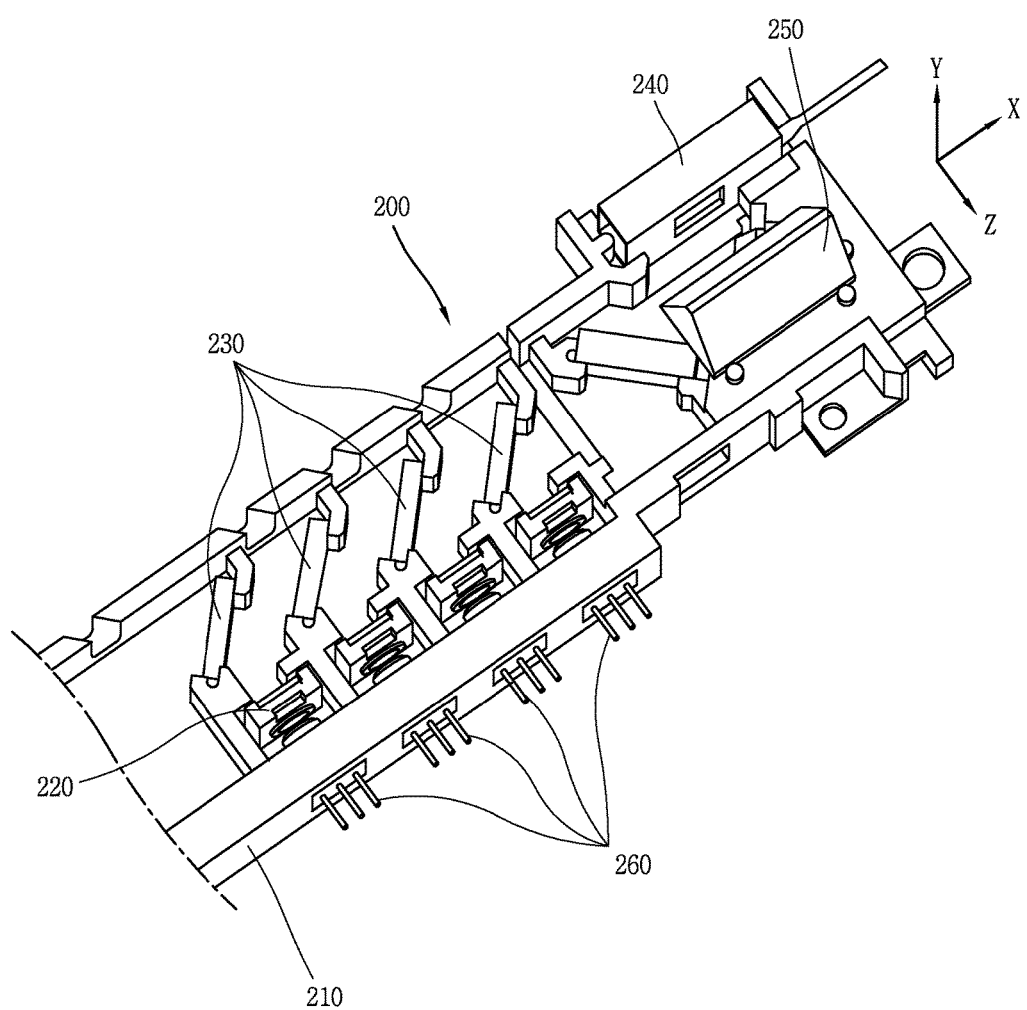
FIG. 3 is a perspective view of an optical component assembly mounted in the image projection apparatus according to the exemplary embodiment.

FIG. 3 is a perspective view of an optical system 200 mounted in the image projection apparatus according to the exemplary embodiment.

The optical system 200 may be mounted in the lower case 112. The optical system 200 means a system of optical components, in which reflecting mirrors, lenses, and the like are properly disposed to implement the image of an object using light reflection or refraction in the image projection apparatus 100. A structure into which the optical system 200 can be assembled may be additionally disposed between the optical system 200 and the lower case 112. The structure includes a base member 210 having mounting holes. Each mounting hole is disposed to have a relative height.

Referring to FIG. 3, the optical system 200 includes the base member 210, light sources 260, collimating lenses 220, dichroic mirrors 230, a scanning mirror 240, a prism 250, and the like.

The base member 210 may include mounting holes in which the respective light sources are mounted.

The light source 260 includes a plurality of laser diodes emitting beams of different wavelengths. According to an exemplary embodiment, the plurality of laser diodes are configured to include a red diode, a green diode and a blue diode. That is, the light sources is configured to include diodes emitting beams of the three primary colors, thereby generating beams of various colors through combinations of the three primary colors.

The collimating lens 220 is disposed at the front of the light source 260 to convert beams generated in the light source into parallel beams. In order to increase the intensity and uniformity of beams spread from a laser diode, it is required to convert the beams into parallel beams. To this end, the beams are focused using a condensing lens such as the collimating lens 220.

The respective color beams (red, green and blue) converted into the parallel beams through the collimating lenses 220 are separated or mixed through the dichroic mirrors 230. According to an exemplary embodiment, coating is formed on the surface of the dichroic mirror 230 so that transmission or reflection is made according to the wavelength of a beam. In order to minimize the reflectivity of the beam, anti-reflection (AR) coating is formed on the surface of the dichroic mirror 230.

The respective color beams coming from the dichroic mirrors 230 are incident on the surface of a micro display device. The micro display device may be a micro-electro-mechanical system (MEMS) scanning mirror 240. The MEMS scanning mirror 240 has a magnetic field to be formed by a permanent magnet and a coil in an electromagnetic manner. Thus, the MEMS scanning mirror 240 is horizontally/vertically driven according to resolution or conditions of the system.

Figure 4:
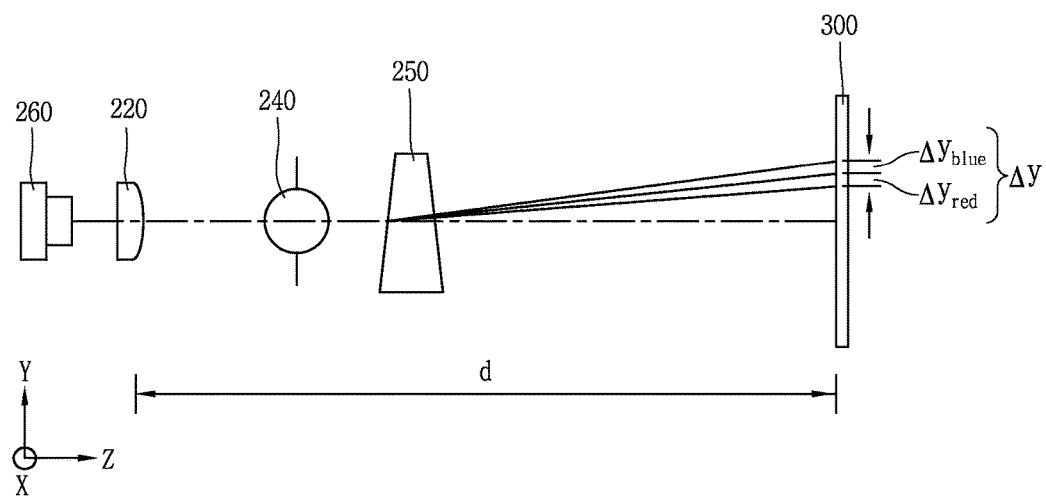
FIG. 4 is a conceptual view showing an operation of an optical system of FIG. 3.

The beams reflected on the scanning mirror 240 pass through the prism 250, thereby projecting an image on a screen 300 (see FIG. 4). The prism 250 performs a function of correcting distortion of the image projected on the screen 300.

Figure 5:
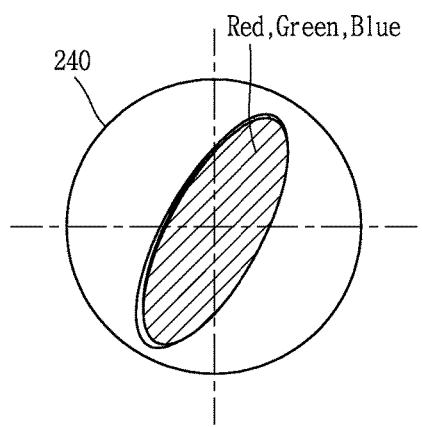
FIG. 5 is a conceptual view showing positions of beams on the surface of a scanning mirror before the beams are aligned on a screen.
Figure 6:
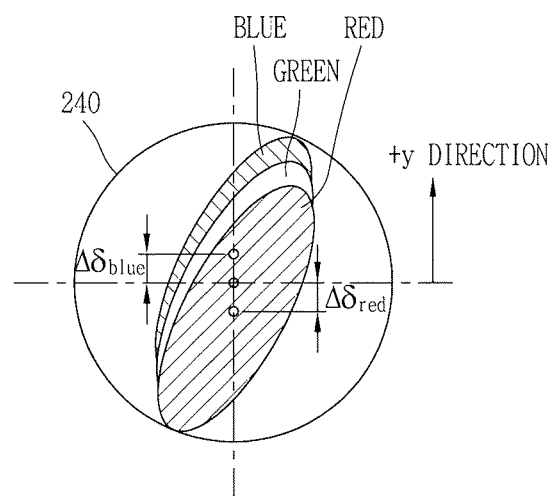
FIG. 6 is a conceptual view showing positions of the beams on the surface of the scanning mirror after the beams are aligned on the screen.

FIG. 4 is a conceptual view schematically showing an operation of the optical system 200 of FIG. 3. FIG. 5 is a conceptual view showing positions of beams on the surface of the scanning mirror 240 before the beams are aligned on the screen 300. FIG. 6 is a conceptual view showing positions of the beams on the surface of the scanning mirror 240 after the beams are aligned on the screen 300.

Referring to FIG. 4, when the optical axes of the light source 260 and the scanning mirror 240 correspond to each other, aberrations are generated on the screen 300 distant at a predetermined distance d due to differences in refractive index for each wavelength between the respective color beams projected through the prism 250. In FIG. 4, the aberration $\Delta y_{red}$ between the red and the green and the aberration $\Delta y_{blue}$ between the blue and green has been illustrated. If the light source 260 or the collimating lens 220 is moved to a certain distance in a y-axis direction in order to eliminate the aberrations, the positions of the respective color beams can correspond to one another.

However, in a case where the positions of the color beams on the screen 300 are aligned by moving the light source 260 or the collimating lens 220, the beams may be out of the surface of the scanning mirror 240, thereby degrading optical efficiency.

Referring to FIGS. 5 and 6, before the positions of the color beams are aligned on the screen 300, each color light is incident on the surface of the scanning mirror 240 without being out of the external diameter of the scanning mirror 240. However, after the positions of the color beams are aligned on the screen 300 by moving the light source 260 or the collimating lens 200, there occur differences in height between the respective color beams incident on the surface of the scanning mirror 240 as shown in FIG. 6. As the distance d between the optical system 200 and the screen 300 increases, $\Delta\delta$ of the scanning mirror 240 also increases. Therefore, each color beam is out of the external diameter of the scanning mirror, thereby degrading optical efficiency.

Figure 7:
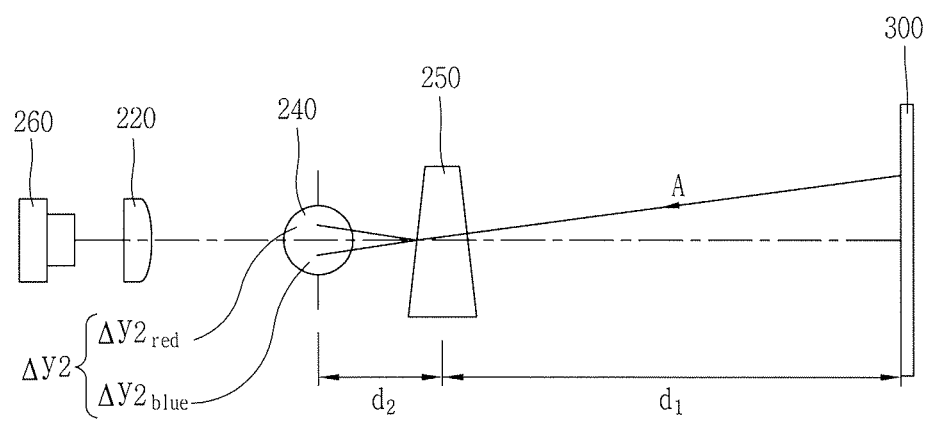
FIG. 7 is a conceptual view showing positions of the beams on the surface of the scanning mirror after aberrations are corrected on the screen.

FIG. 7 is a conceptual view showing positions of the beams on the surface of the scanning mirror 240 after aberrations are corrected on the screen 300.

According to an exemplary embodiment, each laser diode is mounted to have a relative height. The relative heights are determined based on differences in height between the respective color beams incident on the scanning mirror 240 when each color beam is incident toward the prism 250 in a reverse direction A from one point on the screen 300.

As shown in this figure, the order of the beams incident on the surface of the scanning mirror 240 becomes an order of the red, green and blue, based on the y axis. Here, the distance d2 between the scanning mirror 240 and the prism 250 is by far shorter than that d1 between the prism 250 and the screen 300, and thus the decenter amount $\Delta y2$ generated due to the differences in refractive index for each wavelength on the surface of the scanning mirror 240 is by far smaller than that $\Delta y$ generated on the screen 300. That is, although the distance between the image projection apparatus 100 and the screen 300 increases, the distance between the scanning mirror 240 and the prism 250 is by far shorter than that between the image projection apparatus 100 and the screen 300, and thus the decenter amount $\Delta y2$ can be decreased.

As described above, the laser diodes are disposed in parallel to the positions at which the respective color beams incident on the prism 250 in the reverse direction from the one point on the screen 300. That is, according an exemplary embodiment, a green diode 262 (see FIG. 8) is disposed at a reference height, a red diode 263 (see FIG. 8) is disposed higher than the reference height, and a blue diode 261 (see FIG. 8) is disposed lower than the reference height.

Figure 8:
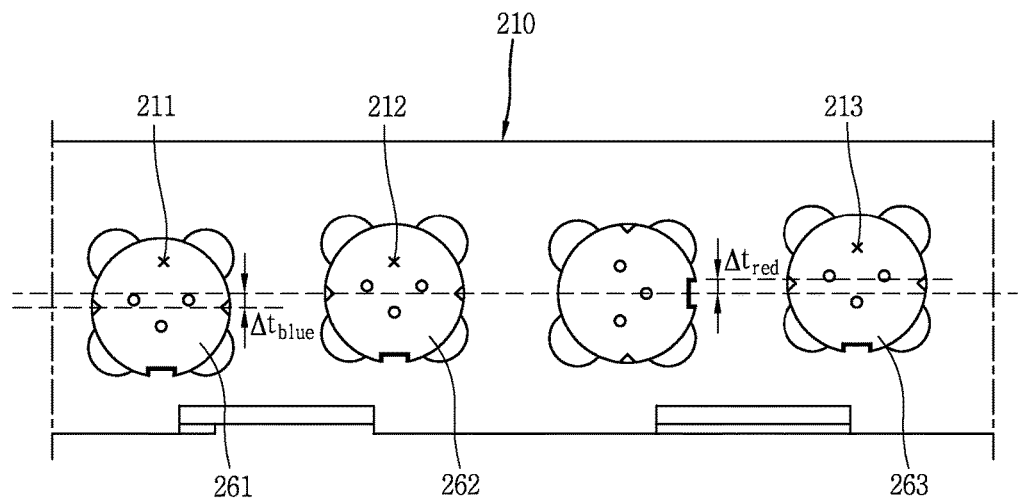
FIG. 8 is a conceptual view showing the arrangement of mounting holes of a base member of FIG. 3.
Figure 9A:
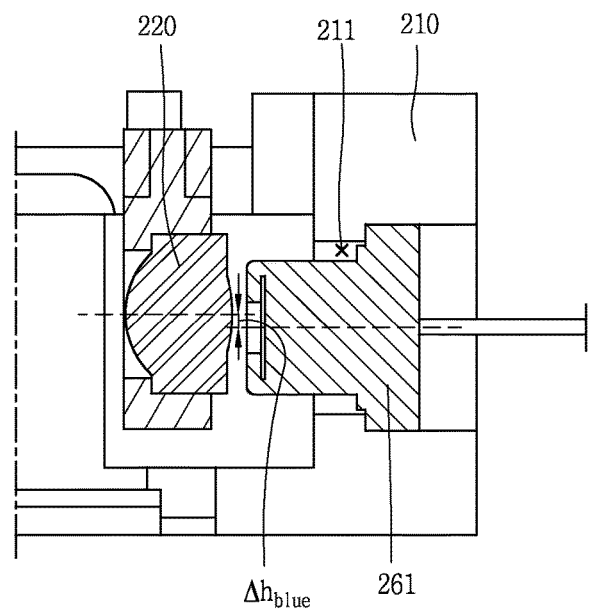
FIGS. 9A and 9B are side sectional views of the base member of FIG. 8.
Figure 9B:
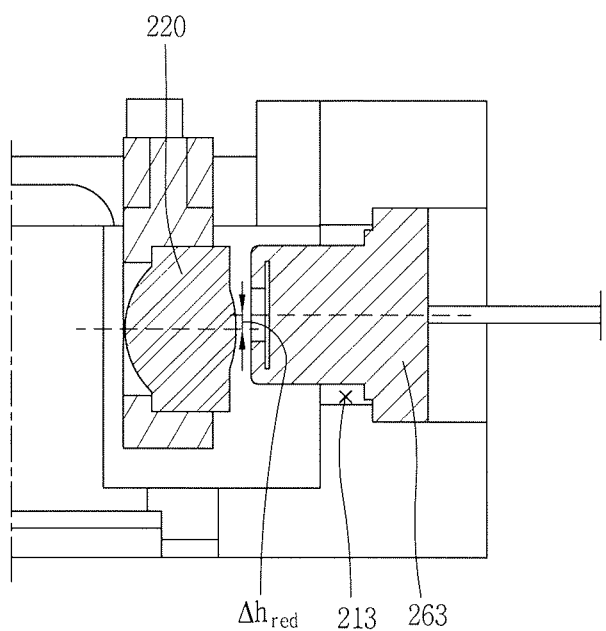

FIG. 8 is a conceptual view showing the arrangement of the mounting holes 211, 212, 213 of the base member 210 of FIG. 3. FIGS. 9A and 9B are side sectional views of the base member 210 of FIG. 8

As shown in these figures, the heights of the laser diodes are determined corresponding to the positions of the respective color beams incident on the surface of the scanning mirror 240 as described with reference to FIG. 7.

Referring to FIG. 8, the green diode 262 is disposed at the reference height. The diode that becomes a reference may be differently set depending on situations. However, in the exemplary embodiment, the red diode 263 and the blue diode 261 are disposed in opposite directions based on the green diode 262, and hence the green diode 262 is used as the reference. That is, in the exemplary embodiment, the red diode 263 is disposed to be spaced apart from the reference height by $\Delta t_{red}$ in the +y-axis direction, and the blue diode 261 is disposed to be spaced apart from the reference height by $\Delta t_{blue}$ in the −y-axis direction. The values of $\Delta t_{red}$ and $\Delta t_{blue}$ may not be equal to each other.

In the exemplary embodiment, the light source 260 is formed to include the red diode 263, the green diode 262 and the blue diode 261. However, according to another exemplary embodiment, the light source may include diodes of a larger number of colors. In this case, as the difference in wavelength between the color beam of a diode that becomes the reference and the color beam of another diode is increased, the vertical spacing distance is further increased.

In FIGS. 9A and 9B, the arrangement of the diodes and the condensing lens has been illustrated in order to allow the beams of the respective diodes to be positioned on the surface of the scanning mirror 240 as shown in FIG. 7. According to an exemplary embodiment, each diode is disposed to have a relative height as described with reference to FIG. 7, and the collimating lens 220 is necessarily assembled to have a difference of $\Delta h$ from each diode. For example, in the case of the red, the axis of the collimating lens 220 is necessarily moved by $\Delta h_{red}$ in the −y-axis direction with respect to the red diode 263. In the case of the blue, the axis of the collimating lens 220 is necessarily moved by $\Delta h_{blue}$ in the +y-axis direction with respect to the blue diode 261. Here, the values of $\Delta h_{red}$ and $\Delta h_{blue}$ may not be equal to each other.

As described in the above exemplary embodiments, in the image projection apparatus of the present disclosure, aberrations on the screen 300, generated due to the prism 250, are corrected, and simultaneously, the decenter beam of each color beam on the surface of the MEMS scanning mirror 240 is minimized, thereby improving optical efficiency and increasing the brightness of images.

The image projection apparatus of the present disclosure is not limited to configurations and methods of the above-described embodiments, and all or some of the respective embodiments may be selectively combined so as to achieve various modifications.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for setting relative heights of laser diodes of an image projection apparatus comprising a light source including the laser diodes for respectively emitting beams of different wavelengths from each other, a scanning mirror configured to reflect the beams radiated from the light source and project the reflected beams, and a prism disposed at a rear of the scanning mirror to decenter the beams via the scanning mirror based on wavelengths, the method comprising:

outlining beams in a reverse direction from one point on a screen to the prism along the same path;
   allowing the outlined beams to be decentered from the prism to the scanning mirror based on differences in refractive index for each wavelength; and
   determining relative heights of the laser diodes with respect to a reference height based on differences in height between the outlined beams decentered to the scanning mirror by the prism.

2. The method of claim 1, wherein the light source, the scanning mirror and the prism are disposed in a first plane, and
   wherein the determining is performed to determine the relative heights of the laser diodes on a second plane perpendicular to the first plane.

3. The method of claim 1, wherein the relative heights are less than 1 mm.

4. The method of claim 1, wherein the laser diodes include a red diode, a green diode and a blue diode, and
   wherein the determining is performed to determine relative heights of the red diode and the blue diode to be spaced apart in an opposite direction to each other, using a height of the green diode as a reference height.

5. The method of claim 1, wherein the laser diodes include a red diode, a green diode and a blue diode, and
   wherein the determining is performed to determine a relative height of the red diode to be higher than the green diode by a first height, and a relative height of the blue diode to be lower than the green diode by a second height.

6. The method of claim 1, wherein the image projection apparatus further comprises a collimating lens disposed at the front of the light source to convert the beams of the light source into parallel beams, and
   wherein the determining is performed to determine a focus of the light source by determining relative position of the collimating lens and the light source.

7. The method of claim 6, wherein the determining is performed to determine relative position of the each laser diode with respect to the collimating lens, so that the collimating lenses respectively correspond to the optical axes of beams irradiated from the laser diodes having the relative heights to pass through the prism.

8. The method of claim 1, wherein the determining is performed to determine the relative heights of the laser diodes to be spaced apart from each other to have relative height differences using, as a reference, a diode corresponding to any one of a plurality of colors constituting the laser diodes, and
   wherein the relative height difference corresponds to a difference between a wavelength corresponding to the color of the diode that is the reference among the laser diodes and a wavelength corresponding to a color constituting each of the other diodes.

9. The method of claim 8, wherein the relative height difference is proportional to the difference between the wavelength corresponding to the color of the diode that is the reference among the laser diodes and the wavelength corresponding to the color constituting each of the other diodes.

10. The method of claim 1, wherein a distance between the prism and the screen is longer than a distance between the prism and the scanning mirror.

11. The method of claim 1, wherein the outlining is performed to the beams of each of the laser diodes.

* * * * *